(12) United States Patent
Lee

(10) Patent No.: US 6,504,877 B1
(45) Date of Patent: Jan. 7, 2003

(54) SUCCESSIVELY REFINABLE TRELLIS-BASED SCALAR VECTOR QUANTIZERS

(75) Inventor: Cheng-Chieh Lee, Basking Ridge, NJ (US)

(73) Assignee: Agere Systems Inc., Miami Lakes, FL (US)

( * ) Notice: Subject to any disclaimer, the term of this patent is extended or adjusted under 35 U.S.C. 154(b) by 0 days.

(21) Appl. No.: 09/460,948

(22) Filed: Dec. 14, 1999

(51) Int. Cl.[7] ................................. H03M 13/25

(52) U.S. Cl. .................. 375/265; 375/298; 341/200; 704/222; 704/230

(58) Field of Search ................. 375/261–265, 375/298; 341/200; 704/222, 230

(56) References Cited

U.S. PATENT DOCUMENTS 5,388,124 A    2/1995    Laroia et al. ............. 375/17

Primary Examiner—Amanda T. Le

(57) ABSTRACT

Methods of designing successively refinable Trellis-Based Scalar-Vector quantizers (TB-SVQ) include a multi-stage process wherein a TB-SVQ is applied to a set of digital data to set up a codebook boundary and to obtain a non-uniform density gain for a constellation in which the data signals will be encoded. In at least one more stage, a Trellis coded quantizer (TCQ) is applied to the output codebook boundary of the first stage to obtain a granular or shaping gain of 1.53 dB. The inventive methods successively refine the TB-SVQ so that robust signal transmission is achieved. By applying a multi-stage process wherein a TB-SVQ is utilized in the first stage and a TCQ is utilized in the second and successive stages, the computational complexity and time for encoding the constellation are greatly reduced.

6 Claims, 3 Drawing Sheets

| RATE (BITS/ SAMPLE) | m-SPHERE | | m-PYRAMID | |
|---|---|---|---|---|
| | 16 | 32 | 16 | 32 |
| 1 | 7 (0.01) | 12 (0.04) | 5 (0.11) | 10 (0.05) |
| 2 | 35 (0.02) | 64 (0.01) | 19 (0.01) | 35 (0.01) |
| 3 | 151 | 272 | 46 | 86 |

FIG. 4A

| $(r_1,r_2)$ | SR-TCQ $SNR_1$ | $SNR_2$ | TBSVQ-16 $SNR_1$ | $SNR_2$ | TBSVQ-32 $SNR_1$ | $SNR_2$ | R(D) $SNR_1$ | $SNR_2$ |
|---|---|---|---|---|---|---|---|---|
| (1,1) | 4.97 | 10.37 | 5.31 | 10.64 | 5.25 | 10.61 | 6.02 | 12.04 |
| (1,2) | 4.99 | 15.82 | 5.34 | 16.10 | 5.27 | 16.14 | 6.02 | 18.06 |
| (2,1) | 10.52 | 16.21 | 10.90 | 16.32 | 11.14 | 16.60 | 12.04 | 18.06 |
| (1,3) | 5.00 | 21.42 | 5.34 | 21.50 | 5.28 | 21.71 | 6.02 | 24.08 |
| (2,2) | 10.54 | 21.69 | 10.92 | 21.80 | 11.16 | 22.15 | 12.04 | 24.08 |
| (3,1) | 16.18 | 21.99 | 16.41 | 21.85 | 16.73 | 22.20 | 18.06 | 24.08 |

FIG. 4B

| $(r_1,r_2)$ | SR-TCQ $SNR_1$ | $SNR_2$ | TBSVQ-16 $SNR_1$ | $SNR_2$ | TBSVQ-32 $SNR_1$ | $SNR_2$ | R(D) $SNR_1$ | $SNR_2$ |
|---|---|---|---|---|---|---|---|---|
| (1,1) | 4.37 | 9.79 | 4.83 | 10.23 | 5.39 | 10.83 | 6.62 | 12.66 |
| (1,2) | 4.39 | 15.09 | 4.86 | 15.47 | 5.41 | 16.10 | 6.62 | 18.68 |
| (2,1) | 9.42 | 15.45 | 10.92 | 16.26 | 11.29 | 16.74 | 12.66 | 18.68 |
| (1,3) | 4.39 | 20.54 | 4.87 | 20.85 | 5.41 | 21.66 | 6.62 | 24.71 |
| (2,2) | 9.45 | 20.83 | 10.95 | 21.51 | 11.30 | 22.11 | 12.66 | 24.71 |
| (3,1) | 14.86 | 21.06 | 16.15 | 21.27 | 16.79 | 22.15 | 18.68 | 24.71 |

FIG. 4C

| $(r_1,r_2)$ | SR-TCQ $SNR_1$ | $SNR_2$ | TBSVQ-16 $SNR_1$ | $SNR_2$ | TBSVQ-32 $SNR_1$ | $SNR_2$ | R(D) $SNR_1$ | $SNR_2$ |
|---|---|---|---|---|---|---|---|---|
| (1,1) | 4.28 | 10.81 | 4.72 | 11.04 | 4.69 | 10.99 | 6.02 | 12.04 |
| (1,2) | 4.24 | 16.55 | 4.40 | 16.89 | 4.48 | 16.87 | 6.02 | 18.06 |
| (2,1) | 9.392 | 16.77 | 10.20 | 16.79 | 10.48 | 17.03 | 12.04 | 18.06 |
| (1,3) | 3.98 | 22.49 | 3.59 | 22.68 | 4.24 | 22.76 | 6.02 | 24.08 |
| (2,2) | 9.23 | 22.56 | 9.88 | 22.71 | 10.19 | 22.99 | 12.04 | 24.08 |
| (3,1) | 15.17 | 22.57 | 15.57 | 22.38 | 16.00 | 22.67 | 18.06 | 24.08 |

FIG. 4D

| $(r_1,r_2)$ | SR-TCQ $SNR_1$ | $SNR_2$ | TBSVQ-16 $SNR_1$ | $SNR_2$ | TBSVQ-32 $SNR_1$ | $SNR_2$ | R(D) $SNR_1$ | $SNR_2$ |
|---|---|---|---|---|---|---|---|---|
| (1,1) | 3.36 | 10.33 | 4.23 | 10.68 | 4.81 | 11.23 | 6.62 | 12.66 |
| (1,2) | 3.55 | 15.83 | 3.81 | 16.38 | 4.72 | 16.77 | 6.62 | 18.68 |
| (2,1) | 8.66 | 15.99 | 10.14 | 16.77 | 10.57 | 17.20 | 12.66 | 18.68 |
| (1,3) | 3.03 | 21.64 | 3.43 | 22.15 | 4.26 | 22.78 | 6.62 | 24.71 |
| (2,2) | 8.33 | 21.75 | 9.77 | 22.46 | 10.23 | 22.96 | 12.66 | 24.71 |
| (3,1) | 12.49 | 21.87 | 15.19 | 21.88 | 16.05 | 22.60 | 18.68 | 24.71 |

SUCCESSIVELY REFINABLE TRELLIS-BASED SCALAR VECTOR QUANTIZERS

BACKGROUND OF THE INVENTION

1. Field of the Invention

The present invention relates generally to fixed-rate, successively refinable quantizers with improved rate-distortion performance. More specifically, the invention relates to successively refinable Trellis-Based Scalar-Vector quantizers (TB-SVQ) which achieve improved rate-distortion performance and which allow robust transmission of audio and video signals.

2. Description of the Related Art

Modem data communication systems rely on structured vector quantization schemes wherein a set of data points in a transmitted message word is modeled as a constellation of points. The constellation is a subset of coded bits enclosed within a bounded region wherein each encoded bit is assigned an energy level according to its position in the constellation. A trellis-based scalar-vector quantizer (TB-SVQ) is a type of structured vector quantizer scheme that takes advantage of the fact that for a certain class of memoryless sources, the TB-SVQ can approach a rate-distortion limit, as for example a Gaussian or Laplacian distribution. The TB-SVQ technique is therefore quite useful for transmitting data over additive white Gaussian noise (AWGN) channels which are typical data channels for the Internet or, indeed, any transmission system using modems or other direct data lines such as digital subscriber lines (DSL), T1 lines or other high-speed data links.

Prior encoding techniques have tended to be codebook-based in that they require a memory of codes that can be compared against current incoming data to reconstruct the data word after transmission. Since a memory of codes is used in these systems they are inherently accurate in reproducing the data word, but much slower and less robust than systems that utilize memoryless sources. However, other prior art systems have extended the TB-SVQ scheme to effectively solve the excitation codebook search problem embedded in code excited linear prediction (CELP) speech coders in an effort improve the speed of such systems while maintaining the reliability achieved with the use of a codebook. See C. C. Lee and R. Laroia, "Trellis Code Excited Linear Prediction (TCELP) Speech Coding." Bell Labs Technical Memorandum 11332-981030-26TM.

Successively refinable source coders have been designed to output bit streams so that rate-scalability can be achieved. In this type of encoding scheme, partial reconstruction of the data is done with the core bit stream and additional approximations to the original signal are obtained by each additional refinement layer. Successive refineability can be achieved by using a hierarchical (multi-stage) coding structure whereby at each stage the residual between the original and the reproduction from the previous stage is quantized using a Trellis Coded Quantizer (TCQ). Use of the TCQ achieves a granular or shaping gain of about 1.53 dB, which is the theoretical upper limit. Unfortunately, the performance of each quantization stage is in general notably inferior to that of a TCQ of an equivalent bit rate.

To improve rate-distortion performance, an alternative similar to the successively refinable scalar quantizers has heretofore been employed. Utilizing this approach, at each stage of the fixed-rate successively refinable trellis coded quantizers (SR-TCQ), each reproduction symbol of the current stage is assigned an embedded alphabet that is confined for use in the subsequent refinement TCQ. This idea has also been applied to design entropy-constrained embedded trellis coded quantizers which perform very close to the rate-distortion boundary. However, the variable-rate nature of these quantizers sometimes causes other practical problems such as buffering control and error propagation.

Apart from the granular or shaping grain mentioned above, vector quantizers are also superior to scalar quantizers in that they achieve a "boundary gain", which is realized by selecting a codebook boundary which ensures that most of the code-vectors are placed in a high-probability region of the m-space, and a "non-uniform" density gain which results from having the code-vectors closely spaced in higher probability density regions and farther apart in lower probability density regions of the m-space. Although the TCQ can realize a significant granular gain, it makes no attempt to exploit the boundary gain and realizes only some non-uniform density gain by allowing the underlying reproduction alphabet to have non-uniformly spaced levels. It would therefore be useful if a method and apparatus were developed in which vector quantizers could achieve an acceptable granular gain as well as high levels of boundary and non-uniform gain. Such needs have not heretofore been achieved in the art.

Yet other approaches have been proposed to shape the constellation and achieve an optimal m-sphere codebook boundary in an m-dimensional space. See U.S. Pat. No. 5,388,124 to Laroia et al., titled Precoding Scheme For Transmitting Data Using Optimally-Shaped Constellations Over Intersymbol-Interference Channels, the teachings of which are expressly incorporated herein by reference. Laroia et al. introduced the TB-SVQ for memoryless sources. The TB-SVQ achieves a large boundary gain while the underlying trellis code enables it to realize a significant granular gain. Since the TB-SVQ can be derived from a non-uniform scalar quantizer, it can also achieve non-uniform density gain. It would therefore be desirable to exploit the advantages inherent in TB-SVQs to achieve high levels of granular gain as well as high levels of boundary and non-uniform density gain. This has not heretofore been achieved in the art.

SUMMARY OF THE INVENTION

The aforementioned problems are solved, and long felt needs met, by methods of the present invention for designing a successively refinable TB-SVQ for a memoryless source which outputs a signal that can be characterized as a set of digital data for transmission in a communication system. The inventive methods preferably comprise at least a two-stage process for creating a codebook for the source so that the reproduction symbols can be reproduced in a robust manner. In a first stage, a TB-SVQ is applied to the data so that the codebook boundary can be obtained and acceptable boundary and non-uniform density gains can be achieved. In at least one more successive stage, a TCQ is applied so that a high granular or shaping gain is achievable, preferably about 1.53 dB.

The methods of designing successively refinable TB-SVQs for memoryless sources provided in accordance with the present invention reduce the complexity of the resulting TB-SVQs and ensure that highly robust data transmission is achieved. By employing the multiple stage approach recursively on the signal data, rate-distortion of the encoded signals is minimized and multimedia signals such as audio and video signals can be transmitted robustly through the communication system. This tends to reduce computational complexity in the systems employing the inventive methods and greatly improves the efficiency of data transmission in and through the optical communication system. Moreover, by employing the inventive methods, a shaping gain of close to or approaching or substantially 1.53 dB can be achieved, which is the theoretical upper limit of the shaping gain. Such results have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals refer to like elements throughout the several views:

FIGS. 4A, 4B, 4C and 4D are tables listing simulated results for the methods of the present invention, wherein FIG. 4A depicts the performance (signal-to-noise ratio (SNR) in dB) of the successive refinable TB-SVQ for $\omega_1=\omega 2=0.5$ for a Gaussian source, FIG. 4B depicts the performance of the TB-SVQ of FIG. 4A for a Laplacian source, FIG. 4C depicts the performance for ($\omega_1=0$, $\omega_2=1$ for a Gaussian source, and FIG. 4D depicts the performance of the TB-SVQ of FIG. 4C for a Laplacian source.

DETAILED DESCRIPTION OF THE PRESENTLY PREFERRED EMBODIMENTS

Figures 1, 3:
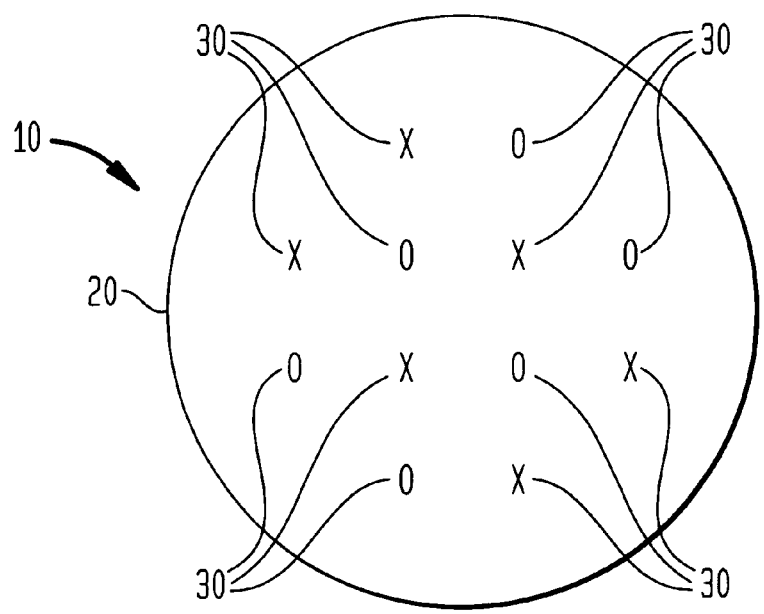
FIG. 1 is an example depiction of a signal constellation wherein individual data bits are mapped to the constellation in a two-dimensional (2D) energy space.
FIG. 3 is a table of the threshold norm of a TB-SVQ developed with the inventive method with an m-sphere or m-pyramid codebook boundary wherein the corresponding SVQ coding redundancy is compared.

FIG. 1 shows an exemplary data signal constellation 10 which is used to transmit digital data over narrow band and wide band channels such as voice-based telephone lines or wireless links. The constellation 10 is essentially an energy map in which the individual data bits of a data word are placed according to an assigned energy level. This creates a 2D energy space in which the individual bits (x's and o's in the energy space of FIG. 1) are characterized by their positions in the constellation. Constellation 10 generally comprises a boundary 20 within which the several constellation points or data bits 30 are mapped. Since the individual bits are characterized according to their energy levels and are so plotted, they experience various effects associated with transmission such, for example, as energy distortion, amplitude response rolloff and envelope distortion at the upper and lower band edges of the constellation. Moreover, as higher bandwidths and data rates are achieved in modern communication systems, more points are added to the constellation which further tends to distort the signal.

In order to overcome these problems, techniques have been developed in the past which manipulate the constellation to achieve optimal transmission results. These techniques are generally called "constellation shaping" techniques or methods and they generally require a reduction in the transmitted signal power for a fixed minimum distance between constellation points. By shaping the constellation in this manner, more reliable data transmission over channels that have been corrupted by white or Gaussian noise can be achieved.

In accordance with a preferred embodiment of the present invention, a codebook is structured for memoryless sources in multiple stages, the first of which utilizes the TB-SVQ to shape the codebook boundary, and wherein all stages utilize the TCQ to realize an acceptable granular and non-uniform density gains. By employing this combined approach a successively refinable, embedded rate quantizer can be realized with improved rate-distortion performance and the ability to handle multimedia signals robustly.

The TB-SVQ can be characterized by a codebook structure having a reproduction alphabet Q and a trellis code T(Q) defined by partitioning Q into subsets and using these subsets to label transitions in a trellis diagram. Thus, a TB-SVQ is a quantizer that functions on discrete energy levels rather than on a continuous energy plane. This allows the TB-SVQ to be more readily manipulated and allows data transmission to occur more smoothly as compared to other kinds of quantizers. In any event, while the present invention has been described with respect to TB-SVQs, it should be recognized by those skilled in the art that other types of quantizers may be amenable to the methods of the present invention and that all such quantizers are within the intended scope and contemplation of the invention. For exemplary purposes, and without intending to unduly limit the invention, the inventive methods will be described throughout with respect to TB-SVQs.

A sequence $c_i$ (which is a member of Q) is a code-sequence of T(Q) if the corresponding sequence of subsets addresses a continuous path in the trellis diagram. The TB-SVQ codebook is a subset of code-sequences $\{c_i\}$ of T(Q) with the additional constraint that when $\{c_i\}$ is partitioned into m-vectors, each m-vector will lie inside a proscribed codebook boundary. Thus, in accordance with the invention the TB-SVQ can be implemented to quantize an otherwise memoryless source such as a Gaussian or Laplacian source. Similarly, the inventive methods are applicable to any memoryless source, but for ease of explanation will be described throughout with respect to Gaussian or Laplacian sources.

Since Gaussian source distributions are symmetric, the Q alphabet is assumed to be defined as $\{+/-q_i: i=1, 2, \ldots, n\}$ and can be partitioned into two subsets $Q_A$ and $Q_B$ by assigning a rightmost level $q_n$ to one subset, assigning the following $q_{n-1}$ to the other subset, and so forth alternatively until the leftmost level $-q_n$ is assigned. Accordingly, both $Q_A$ and $Q_B$ have n levels and it is possible to pair every level $q_i$ in $Q_A$ with a distinct $-q_i$ in $Q_B$.

In a preferred embodiment, the underlying trellis code T(Q) is an Ungerboeck's 1D rate-½ code as described in G. Ungerboeck, "Channel Coding with Multilevel/Phase Signals," IEEE Trans. Inform. Theory, vol. IT-28, pp. 55–67 (January 1982), the teachings of which are expressly incorporated herein by reference. This T(Q) assumes that all outgoing branches of each trellis state are collectively labeled exclusively by $Q_A$ or $Q_B$, which means that all permissible reproduction symbols for an input source sample are either in $Q_A$ or $Q_B$ and are dictated by the trellis state. Thus, a code sequence $\{c_i\}$ of T(Q) can be mapped to a sequence $\{d_i$ a member of $Q^+)$ where $Q^+$ is defined as $\{q_i: i=1, 2, \ldots, n\}$ and $d_i=|c_i|$.

The optimal codebook boundary in the mD space for memoryless Gaussian distributions is an m-sphere which can be implemented by assigning for each symbol $q_i$ a member of $Q^+$ and an $L_2$ norm, as for example $l_i = q_i^2$. A block of m samples in $\{d_i\}$ then lies inside the codebook if its cumulative $L_2$ norm is no greater than the norm of the radius of the codebook sphere, denoted by L. This threshold is determined as the largest norm such that the codebook sphere contains no more that $2^{mr}$ code-vectors, where r is the coding rate in bits/sample.

For memoryless Laplacian sources, the optimal codebook boundary is a pyramid which can be similarly implemented provided that an $L_1$ norm is assigned to every $q_i$ that is a member of $Q^+$ and the codebook is a pyramid. For sources whose probability density functions are not explicitly known, the set of norms L has members $\{l_1, l_2, \ldots, l_n\}$ and the threshold norm L can be designed using a generalized Lloyd algorithm as taught in the aforementioned Laroia et al. publication.

To embed the TCQ, the reproduction alphabet can be denoted as:

$$Q^{(i-1)} = \{q_1^{(i-1)}, q_2^{(i-1)}, \ldots, q_{J_{i-1}}^{(i-1)}\}, \quad (1)$$

wherein $J_{i-1}$ is the cardinality of $Q^{i-1}$ and at the core or first stage of the inventive methods, i.e. the TB-SVQ stage, $Q^1 = Q$ and $J_1 = 2_n$. To increase the resolution of the subsequent stages, that is the $i^{th}$ stage quantizer, it is desired to populate for each symbol in $Q^{i-1}$ a refined codebook. Thus, if a source sample is quantized to $q_j^{(i-1)}$ and it is desired to further quantize this source sample using an $r_i$ bits/sample TCQ, the fact that the source sample is quantized to $q_j^{(i-1)}$ dictates that the TCQ codebook $Q_j^i$ for $2^{r_i+1}$ reproduction symbols should be in the neighborhood of $q_j^{(i-1)}$. The overall reproduction alphabet for the $i^{th}$-stage quantizer is a union of all these conditional alphabets, to wit:

$$Q^{(i)} = \bigcup_{j=1}^{J_{i-1}} Q_j^{(i)} \quad (2)$$

A codebook search procedure is then performed, in which a preferred solution employs a tree-structured approach that starts from the core stage TB-SVQ and hierarchically operates the refinement quantizers depending on the quantized source from the previous stage. Alternately, all quantizers may be integrated into a single Viterbi trellis search procedure that determines the quantized output for all stages simultaneously. Those skilled in the art will recognize that still other codebook search procedures may be employed in carrying out the inventive methods and that it is intended that all such procedures are within the scope of the present invention.

To encode a stationary source $\{X_i\}$ for a codebook design and search procedure in accordance with the inventive methods, it is necessary to characterize the distortion $d(x, y)$ between a source sample x and its reproduction y. The expected distortion for the $i^{th}$-stage quantizer $Q_i$ is $E[d(X, Q_i(X))]$, where X is a random variable from the source $\{X_i\}$. If the source coder sends bit streams of increasing stages via channels of decreasing priority and the $i^{th}$-stage information may only be received after all information from previous stages have been received, then the expected distortion is:

$$D = \sum_{i=1}^{N} w_i E[d(X, Q_i(X))] \quad (3)$$

wherein $\omega_i$ is the probability of receiving the embedded bit streams up to the $i^{th}$-stage.

The inventive methods preferably adopt the weighted distortion expressed by Equation 3. It will be recognized by those skilled in the art that other expressions for weighted distortion may be equally applicable to the inventive methods, and all such expressions are within the intended scope of the invention. Moreover, for ease of explanation going forward, only two stages of quantization will be considered. Nevertheless, those skilled in the art will also recognize that the below-described two stage procedure is extendable to any number of stages as a function of the design criteria and requirements of the particular communication system in which the inventive methods will be employed.

In the following derivation of a codebook search in accordance with the invention, the underlying trellis code for the first stage quantizer is a $v_1$-state trellis code T(Q) defined on the alphabet Q and the space of the trellis states is denoted by $\Sigma_1$, defined as $\{0, 1, \ldots, v_1 -1\}$. Assuming that each symbol in $Q^+$ has a unique norm, there exists a one-to-one mapping between $Q^+$ and L. The trellis diagram for this code can be thought of as a $v_1$-state finite state machine (FSM). At time instant i, an input $l_i$ (a member of L) to the FSM corresponds to its output $y_i$ from one of the n quantization levels allowed in the current state $s_i$ (a member of $\Sigma_1$) and also determines the next state $s_{i+1}$. The FSM can therefore be completely specified by two functions, the next state function, $\eta(.,.): \Sigma_1 \times L$ approaches $\Sigma_1$, with $s_{i+1} = \eta(s_i, l_i)$, and the output function $o(.,.) : \Sigma_1 \times L$ approaches $\Sigma_1$, with $y_i = (s_i, l_i)$. For all trellis codes of interest, the next-state function $\eta$ is invertible for a given input $l_i$ and hence a previous-state function $\mu(., .): \Sigma_1 \times L$ approaches $\Sigma_1$, with $y_i = (s_{i+1}, l_i)$ can also be defined.

The underlying trellis code for the second-stage quantizer in a $v_2$-state trellis code whose space of trellis states is denoted $\Sigma_2$, defined as $\{0, 1, \ldots, v_2-1\}$. Since the second-stage quantizer is controlled by the output of the first stage quantizer described above in accordance with the inventive methods, its operation can be simplified by an extended function $o_2(.,.,.): \Sigma_2 \times \Sigma_1 \times L$ approaching $Q_2$, which determines the closest reproduction symbol in the constrained TCQ codebook.

To perform the codebook search in accordance with the inventive methods, the source sequence of digital data signals can be partitioned into blocks of m-vectors $\{X_k\}$. Denoting $\Delta_{k-1}^{s1, s2}$ as the minimum (weighted) distortion that results when the first k-1 source vectors are quantized to a code sequence such that the final trellis states are $(s_1, s_2)$ a member of $\Sigma_1 \times \Sigma_2$, it is possible to quantize the $k^{th}$ vector to obtain $x_k$ a member of $\{X_{k,1}, X_{k,2}, \ldots, x_{k,m}\}$. The total minimum cumulative (weighted) distortion $D^{i, s2}_{i, s1}$ which results when the first i components of the first stage quantized vector have a total norm of 1, and the final trellis states are $(s_1, s_2)$. To connect the trellis sequences across block boundaries, set:

$$D_{0,s_1}^{l,s_2} = \begin{cases} \Delta_{k-1}^{s_1,s_2} & l=0, \\ \infty & l>0, \end{cases} \bigvee (s_1, s) \in \sum_1 \times \sum_2. \quad (4)$$

The distortion $D_{i,s_1}^{l,s_2}$ is then updated recursively (for i=1, 2, ..., m) by using a dynamic programming algorithm. Any appropriate dynamic programming algorithm may be used, but the inventor has found the Lloyd algorithm disclosed by Laroia et al. to be a most effective dynamic programming algorithm in this situation. Using the Lloyd algorithm, the following can be obtained:

$$D_{i,s_1}^{l,s_2} = \quad (5)$$

$$\min_{(l',s'_1,s'_2)} \left[ D_{i-1,s'_1}^{l',s'_2} + w_1 d(x_i, o(s'_1, l-l'j)) + w_2 d(x_i, o_2(s'_2, s'_1, l-l')) \right],$$

where the triplets $(l', s'_1, s'_2)$ satisfy $l' \geq 0$, $(l-l')$ a member of L, $s'_1 = \mu(s_1, l-l')$, and $s'_2$ a member of $\Sigma_2$ is a potential previous state entering into $S_2$. For each i in equation 5, $D_{i,s_1}^{l,s_2}$ is determined for l a member of $J_{L+1}$ defined as $\{0, 1, ..., L\}$ and $(s_1, s_2)$ a member of $\Sigma_1 \times \Sigma_2$ From the distortion $D_{m,s_1}^{l,s_2}$, $\Delta_k^{s_1,s_2}$ can be updated as follows:

$$\Delta_k^{s_1,s_2} = \min_{0 \leq l \leq L} D_{m,s_1}^{l,s_2}, (s_1 s_2) \in \sum_1 \times \sum_2. \quad (6)$$

By keeping track of the distortion of the survivor path and the path itself, the code-sequence can be obtained that resulted in the distortion $\Delta_k^{s_1,s_2}$ for all $(s_1, s_2)$.

Since it is impractical to wait for the entire source sequence before deciding the code sequence for quantization, due to potentially long quantization delays, it is advantageous to introduce to the codebook search procedure extra buffers for unreleased results before a specified delay. In addition, the state-suppressed search strategy can also used in the TB-SVQ stage to reduce the overall search complexity.

It will be further recognized by those skilled in the art that the methods of the present invention may be implemented on a digital computer operable to execute a software program that embodies algorithms implementing the invention. Alternately, a microprocessor embedded in a device containing the source may be programmed with such algorithms, or the algorithms may be placed in firmware and executed by an application specific integrated circuit or a digital signal processor. All such embodiments are intended to be within the scope and contemplation of the present invention.

Figure 2:
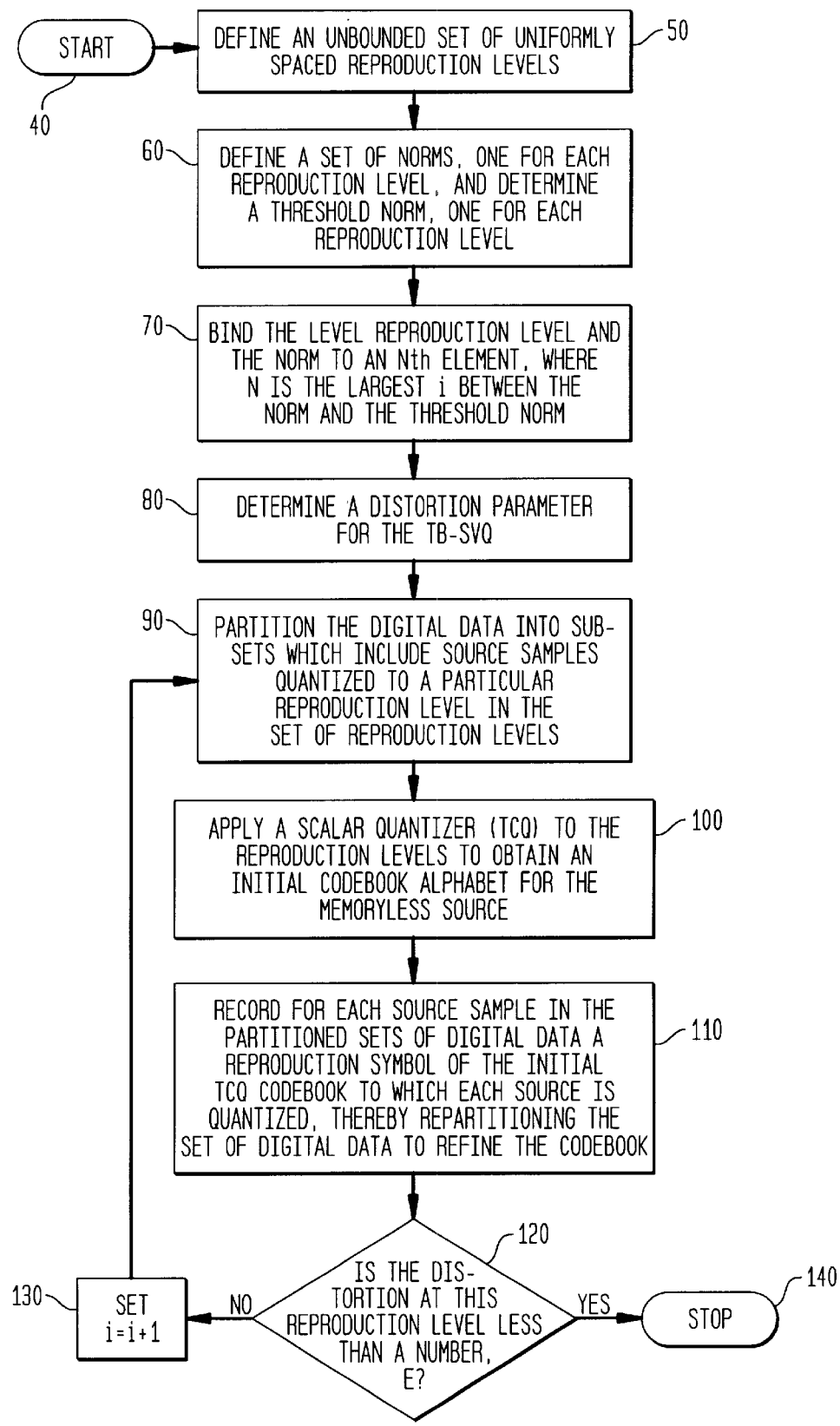
FIG. 2 is a flow chart of a method for designing successively refinable TB-SVQs in accordance with the invention.

Referring now to FIG. 2, a flow chart of a preferred form of the methods of the present invention, which may be implemented in software, is depicted. The method begins at step 40 wherein a set of digital data corresponding to the signal from the memoryless source of samples and which can be characterized as a set of digital data will be received for encoding. At step 50, it is desired to define an unbounded set of uniformly spaced reproduction levels for the TB-SVQ. The unbounded set of uniformly spaced reproduction levels is Q, defined as $\{+/-(2i-1)\beta: i=1, 2, ...\}$ and wherein $\beta$ will be discussed in more detail below.

At step 60, a set of norms is defined, one for each reproduction level, and a threshold norm for each reproduction level is also defined. In a preferred embodiment, the threshold norm is the largest integer such that the primary SVQ with the given (unbounded) Q and L contains no more than $2^{mr_1}$ code-vectors. The resulting threshold L for the TB-SVQ of the same bit-rates and block lengths is shown in the table of FIG. 3. At step 70 each reproduction level and each norm is bound to an $n^{th}$ element in the reproduction level where n is the largest element i between the norm and the threshold norm. At step 80, a distortion parameter $\beta$ for the TB-SVQ is determined. This is preferably accomplished by plotting quantizer distortion on encoding zero-mean unit-variance source sequences as a function of $\beta$ and choosing the value of $\beta$ for which the distortion is minimized.

A simulation was run to test the inventive methods; a computer-generated random sequence of 6.4 million samples was used as the training data. As the number of code-vectors becomes large, the mD source probability density function p(x) becomes increasingly localized to a region inside of which the density p(x) is almost uniform. This property justifies the use of a uniform alphabet Q. At $r_1 = 1$ bit/sample, the optimal value of $\beta$ were found to be 0.42 for a Gaussian source and 0.4 for a Laplacian source. For coding either source at $r_1 = 2$ or 3 bits/sample, the optimal values of $\beta$ was found to be 0.24 and 0.13, respectively.

At step 90, the digital data is positioned into subsets which include source samples quantized to a particular level in the set of reproduction levels. This gives an initial set of TCQ codebooks which can be used in the second and subsequent stages described below. Steps 50 through 90 embody the first stage of the inventive methods wherein the data is initially encoded to achieve the codebook boundary using the TB-SVQ and wherein high boundary and non-uniform density gains are achieved.

Beginning at step 100, the second and optimally additional multiple refinement stages are carried out wherein the TCQ is utilized to achieve a high granular or shaping gain of the constellation of 1.53 dB. The output from step 90, i.e. the initial set of codebooks for the TB-SVQ, is utilized and a small positive number $\epsilon$ is chosen as the maximum allowable distortion. Moreover, i is set to 1 and the distortion $D^{(0)}$ for the second stage is set to infinity. At step 100, a TCQ is applied to the reproduction levels to obtain an initial codebook alphabet for the memoryless source. Then, at step 110, a reproduction symbol of the initial TCQ codebook to which each source is quantized is recorded for each of the source samples in the partitioned sets of digital data thereby repartitioning the set of digital data to refine the codebook.

In a preferred embodiment of step 110, based on the assumption that d(., .) is the squared error in the distortion, each TCQ reproduction symbol is replaced by the centroid of the subset that contains all of the source samples quantized to the corresponding previous symbol. Other replacement reproduction symbol schemes may of course also be employed, and the invention is not intended to be limited to replacing of the symbols by a centroid. For example, those skilled in the art will recognize that other arbitrary shapes may also be employed.

It is then determined at step 120 whether the distortion at this reproduction level is less than $\epsilon$ and, if so, then the second stage has achieved an acceptable granular gain. This is preferably determined by examining whether $(D^{(i-1)} - D^{(i)})/D^{(i-1)} > \epsilon$ and, if so, setting i=i+1 at step 140, at which point the method returns to step 90. If not, then an acceptable distortion has been achieved and the method ends at step 140. This algorithm should converge, at least to a local optimum, if the weighted distortion $D^{(i)}$ decreases with progressive iterations.

In the above-described codebook search, it is assumed that neither $\omega_1$ nor $\omega_2$ is zero, i.e. the distortion in both stages is considered to be a part of the weighted distortion measure. Additionally, the alphabet Q for the TB-SVQ has 2n reproduction symbols, the number of trellis states for the TB-SVQ and the TCQ is denoted by $v_1$ and $v_2$, respectively, and d(., .) is the squared error distortion.

Before solving equation 5 for each source sample, it is desirable to determine the second-stage reproduction symbol $o_2(., ., .)$ for all possible symbols in Q and four partitioned alphabet subsets, each having $2^{r_2-1}$ symbols. This amounts to about 8n scalar quantizing operations per source sample. Determining $D_{i,s1}^{1,s2}$ from equation 5 requires 9n−1 operations (4n additions, 4n multiplications, and n−1 comparisons), resulting in a total of $v_1 v_2 m(L+1)$ (9n−1) operations per source m-block. At the block boundaries, it takes L comparisons to select a survivor path at a given composite of states. In addition, to select the final survivor path from which the reconstruction code-vector may be obtained, $v \, v_2 - 1$ comparisons are required. Overall, the computational cost for these comparisons is approximately $v \, v_2(L+1)(9n-1)+8n$ operations per source sample. This is significantly less expensive—i.e computationally intensive—than prior encoding techniques and therefore solves a long-felt need in the art for TB-SVQ based encoding methods that are computationally efficient. Moreover, by using the TB-SVQ and TCQ encoders, further coding efficiency is achieved since these two coding regimes are approximately independent of the encoding rate. Thus, in as much as the complexity of the second-stage TCQ is approximately independent of the encoding rate and typically the first-stage TB-SVQ is the dominant quantizer, any added complexity introduced to the inventive methods by the TCQ is relatively insignificant. This further adds to the advantageous result of reduced computational costs achieved by the present invention.

The TB-SVQ was used in accordance with the invention to encode ten independently generated random sequences, each of about 160,000 samples matched to the source distribution, a zero-mean unit-variance Gaussian or Laplacian. The Ungerboeck's one-dimensional four-state trellis code, known to those with skill in the art, was used in both stages of quantization. In accordance with the inventive methods, the codebook search algorithm was used with an infinite coding delay and, for each test sequence, the signal-to-noise ratio (SNR) in dB was calculated at both the core TB-SVQ stage and the refinement TCQ stage. The averaged SNRs for the TB-SVQ and the TCQ stages, denoted $SNR_1$ and $SNR_2$, respectively, were used as the metric to assess the coder rate-distortion performance. Quantizers of two considered block lengths (16 and 32), denoted TBSVQ-16 and TBSVQ-32, were considered. The results were also compared to the performance of the SR-TCQ quantizer's rate-distortion.

Referring to FIG. 4A, it was assumed that the two stages were equally important, i.e. $\omega_1=\omega_2=0.5$, and the rate-distortion performance of such quantizers on encoding memoryless Gaussian sources is there shown. The performance of the TB-SVQ of a fixed $r_1$ bits/sample in general varies as a function of the rate for the embedded TCQ. This occurs because the distortion for both stages is considered in the overall weighted distortion as is set forth in equation 5. The performance of the first-stage quantizer of the TBSVQ-16 is superior to that of the SR-TCQ by about 0.3 dB, and a similar performance improvement of the TB-SVQ over the TCQ can be observed. In general, the embedded TCQ outperforms the SR-TCQ by about 0.1 dB. However, when $r_1=3$ and $r_2=1$, the TBSVQ-16 is inferior to the SR-TCQ at the embedded TCQ stage.

When increasing the block length to 32, the inventive quantizer consistently outperformed the SR-TCQ at both stages. On one occasion, with $r_1=r_2=2$, the performance improvement was as high as about 0.5 dB at both stages. For the TB-SVQ stage, the TBSVQ-16 consistently outperformed the TBSVQ-32 at $r_1=1$ bit/sample. This can be seen in FIG. 4A since the 32-dimensional TB-SVQ has a higher coding redundancy (0.04 versus 0.01 bits/sample) than the 16-dimensional quantizer at such a rate for the Gaussian distribution.

Similar results for memoryless Laplacian sources are depicted in FIG. 4B. At $r_1=1$ bit/sample, the performance of the first-stage quantizer of the TBSVQ-16 is superior to that of the SR-TCQ by about 0.5 dB, and the improvement at the embedded TCQ stage is about 0.4 dB. At higher first-stage rates, the TBSVQ-16 may outperform the SR-TCQ by about 1.5 dB at the first stage and by as much as 0.8 dB at the second stage. When increasing the block from 16 to 32, the inventive quantizer improves both stages by at least another 0.5 dB at all considered combinations of coding rates. For Laplacian sources, the inventive quantizer consistently outperformed the SR-TCQ by a significant margin. A significant portion of this improvement is achieved even at $r_1=1$ bit/sample when the TB-SVQ has considerably high SVQ coding redundancy. The first-stage performance of the inventive quantizer was very close to the genuine TB-SVQ without the refinement stage, which indicates that the TB-SVQ performance is robust to the assumed distortion weighting configuration $\omega_1=\omega_2=0.5$. This was true for the Gaussian source as well.

The rate-distortion performance at the embedded TCQ stage can be improved if its distortion is emphasized to a larger extent, i.e. if the value of $\omega_2$ is increased. FIGS. 4C and 4D depict results when $\omega_1=0$ and $\omega_2=1$. In FIG. 4C, the rate-distortion performance of the inventive quantizers on encoding memoryless Gaussian sources is shown in FIG. 4C, which also includes the performance of the similarly configured SR-TCQ quantizer. The performance of the second-stage quantizer of the TBSVQ-16 is better than that of the SR-TCQ by about 0.02 to 0.2 dB, and the performance at the TB-SVQ stage is in general better than that of the SR-TCQ by about 0.5 dB. When increasing the block length from 16 to 32, the performance at both stages is improved by about 0.2 dB in most cases. In the second-stage, the performance of the inventive quantizer is as competitive as, if not better than, that of a genuine TB-SVQ at a rate of $r_1+r_2$ bits/sample. When $r_1=1$, the 32-dimensional quantizer performs slightly worse than the 16-dimensional quantizer because the 32-dimensional TB-SVQ has a higher coding redundancy.

A similar rate distortion performance for memoryless Laplacian sources is depicted in FIG. 4D. The inventive quantizers similarly outperform the pure SR-TCQ at both stages. When compared to coding Gaussian sources, the performance improvements are easily recognizable. In particular, the 32-dimensional quantizer is superior to the SR-TCQ by at least 1 dB in most cases. At $r_1=3$ bits/sample, the performance improvement at the first-stage is even as high as 3.55 dB. It should be noted that, as is shown in FIG. 3, the TB-SVQ entails a considerably higher coding redundancy at $r_1=1$ bit/sample. However, the second stage performance of the inventive quantizer is still as competitive as, if not better than, a genuine TB-SVQ at a rate of $r_1+r_2$ bits/sample.

The inventive methods for designing successively refinable TB-SVQ thus produce highly efficient quantizers for encoding signal data to constellations for data transmission.

The multi-stage methods taught and disclosed herein exploit the best qualities of TB-SVQ encoders and TCQ encoders to produce a new encoding method that evinces low computational complexity yet robust data transmission. Such results have not heretofore been achieved in the art.

While there have been shown and described certain fundamental novel features of the present invention as applied to preferred embodiments thereof, it will be understood by those skilled in the art that various omissions and substitutions and changes in the devices and methods described herein, and in their operation, may be made by those skilled in the art without departing from the spirit of the invention. It is expressly intended that all combinations of those elements and/or method steps which perform substantially the same function in substantially the same way to achieve the same result are within the scope of the invention. Substitution of elements from one described embodiment to another are also fully intended and contemplated. It is the intention, therefore, to be limited only as indicated by the scope of the claims appended hereto.

I claim:

1. A method of designing a successively refinable Trellis-Based Scalar-Vector quantizer for a memoryless source which outputs a signal that can be characterized as a set of digital data for transmission in a communication system, comprising the steps of:

quantizing in a first stage the set of digital data according to a first quantizer to encode the set of digital data in a constellation and create a codebook boundary and a non-uniform density gain for the constellation; and quantizing in a second stage the set of digital data according to a second quantizer to create a codebook within the created codebook boundary and having a high granular grain for the constellation.

2. The method recited in claim 1, wherein the step of quantizing is a first stage comprises the steps of:

receiving the set of digital data characterizing to the signal from the memoryless source, wherein the digital data comprises a set of source samples;

defining an unbounded set of uniformly spaced reproduction levels for the set of source samples of the memoryless source and defining a norm for each of the uniformly spaced reproduction levels, to thereby define a set of norms;

determining a threshold norm for each of the reproduction levels wherein the threshold norm is an integer such that a primary scalar-vector quantizer includes no more than a predetermined number of code-vectors;

bounding each norm in the set of norms and each reproduction level in the set of reproduction levels to an element in each of the reproduction levels wherein the element comprises a large element in the reproduction level between the norm and the threshold norm;

determining a parameter for the first quantizer that minimizes distortion of the first quantizer; and partitioning the set of digital data into subsets wherein each subset includes source samples quantized to a particular reproduction level in the set of reproduction levels.

3. The method recited in claim 2, wherein the step of quantizing in a second stage comprises the steps of applying a scalar quantizer to the reproduction levels to obtain an alphabet of an initial codebook for the memoryless source; and recording for each source sample in the partitioned subsets of digital data a reproduction symbol of the initial codebook to which each source is quantized, thereby repartitioning the set of digital data to refine the codebook.

4. The method recited in claim 3, wherein the first quantizer is a Trellis-Based Scalar-Vector quantizer.

5. The method recited in claim 4, wherein the second quantizer is a Trellis Coded quantizer.

6. The method recited in claim 5, wherein the granular grain is about 1.53 dB.

* * * * *